United States Patent [19]

George et al.

[11] Patent Number: 4,495,623
[45] Date of Patent: Jan. 22, 1985

[54] DIGITAL DATA STORAGE IN VIDEO FORMAT

[75] Inventors: David J. George, Irvine; Hue V. Nguyen, Westminster; Raymond Yardy, Irvine, all of Calif.

[73] Assignee: Discovision Associates, Costa Mesa, Calif.

[21] Appl. No.: 414,094

[22] Filed: Sep. 2, 1982

[51] Int. Cl.³ .............................................. G06F 11/10
[52] U.S. Cl. ........................................ 371/38; 371/40
[58] Field of Search .................................. 371/38, 40

[56] References Cited

U.S. PATENT DOCUMENTS

| | | | |
|---|---|---|---|
| 3,037,697 | 6/1962 | Kahn | 371/50 |
| 3,657,699 | 4/1972 | Rocher et al. | 371/2 |
| 3,876,978 | 4/1975 | Bossen et al. | 371/51 |
| 4,211,997 | 7/1980 | Rudnick et al. | 371/51 |
| 4,271,517 | 6/1981 | Krauss | 371/37 |
| 4,336,612 | 6/1982 | Inoue et al. | 371/38 |
| 4,394,642 | 7/1983 | Currie et al. | 371/40 |

Primary Examiner—Charles E. Atkinson
Attorney, Agent, or Firm—Ronald J. Clark

[57] ABSTRACT

A method and apparatus for encoding a plurality of bytes of digital data into a further plurality of bits suitable for storage in a storage medium, and for recovery therefrom, and for decoding the stored bits retrieved from the storage medium, for the recovery of the encoded bytes. The digital data bytes are arranged into a plurality of code blocks, each having a first predetermined number of columns and a second predetermined number of rows of bytes. A parity block of bytes of data is generated having a number of columns and a number of rows of bytes corresponding to the first predetermined number of columns and to the second predetermined number of rows of bytes, respectively, of the code blocks, the bits of data in the parity block corresponding to the computed parity of the combined corresponding bits in each of the code blocks. Secondly, a parity row of bytes of data are generated for each of the data blocks such that each bit in each byte in the parity row corresponds to the computed parity of the combined corresponding bits in each byte in the column of the associated data block of that parity row. Each such row of parity bytes is added to its associated block. Thirdly, a correction control word is generated for each 8 bit byte of data blocks, parity rows and parity blocks, and is added to its associated byte to form a composite word. The bits of data of all such composite words for all of the blocks are interleaved according to a matrix having a third predetermined number of rows and a fourth predetermined number of columns, and the interleaved data is provided in serial arrangement for storage.

25 Claims, 10 Drawing Figures

54 { 
| 0 | 1 | 2 | 3 | 4 | 5 | 6 | 7 | 8 | 9 | 10 | 11 | 12 | 13 |
|---|---|---|---|---|---|---|---|---|---|----|----|----|----|
| ↓ | ↓ | ↓ | ↓ | ↓ | ↓ | ↓ | ↓ | ↓ | ↓ | ↓  | ↓  | ↓  | ↓  |

| 0   | 1   | 2   | 3   | 4   | 5   | 6   | 7   | 8   | 9   | 10  | 11  | 12  | 13  |
|-----|-----|-----|-----|-----|-----|-----|-----|-----|-----|-----|-----|-----|-----|
| 14  | 15  | 16  | 17  | 18  | 19  | 20  | 21  | 22  | 23  | 24  | 25  | 26  | 27  |
| 28  | 29  | 30  | 31  | 32  | 33  | 34  | 35  | 36  | 37  | 38  | 39  | 40  | 41  |
| 42  | 43  | 44  | 45  | 46  | 47  | 48  | 49  | 50  | 51  | 52  | 53  | 54  | 55  |
| 56  | 57  | 58  | 59  | 60  | 61  | 62  | 63  | 64  | 65  | 66  | 67  | 68  | 69  |
| 70  | 71  | 72  | 73  | 74  | 75  | 76  | 77  | 78  | 79  | 80  | 81  | 82  | 83  |
| 84  | 85  | 86  | 87  | 88  | 89  | 90  | 91  | 92  | 93  | 94  | 95  | 96  | 97  |
| 98  | 99  | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 |
| 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 |
| 154 | 155 | 156 | 157 | 158 | 159 | 160 | 161 | 162 | 163 | 164 | 165 | 166 | 167 |
| 168 | 169 | 170 | 171 | 172 | 173 | 174 | 175 | 176 | 177 | 178 | 179 | 180 | 181 |

DIGITAL DATA STORAGE IN VIDEO FORMAT

BACKGROUND THE INVENTION

1. Field of the Invention

The present invention relates to digital data storage, and more particularly relates to digital data storage in video format.

2. Background Art

The advent of the laser optical disc has given rise to the hope that this new storage medium might provide a breakthrough for low cost, high density digital data storage. Laser optical discs have already been marketed in connection with home video playback systems at prices within the range of many consumers. It has been proposed that the laser optical disc could be used for the storage of digital data for interface with a computer.

Comparing the storage capacity, in millions of characters, of the laser optical disc with that of a hard magnetic disc, the hard magnetic disc has a storage capacity of only 313 million characters, as compared with 12,500,000 million characters for a laser optical disc. By further comparison, the floppy disc, which is frequently used in connection with home and small business computers, has a storage capacity of only 2.5 million characters.* If it were possible to utilize effectively for computer data storage, the very large storage capacity of the laser optical disc, would result in a tremendous advantage because of the relatively low cost of the optical disc.

*Data: RCA Corp., Advanced Technology Laboratories, as reported in Business Week, July 7, 1980, at page 80.

The idea of storing digital data in a video format, that is, storing the digital data as video level signals between the sync pulses of standard NTSC, PAL, or SECAM video signals, so as to permit the use of video processing equipment already developed for storage media such as the laser optical disc, has been proposed. However, there presently exists the need for a practical and reliable method and apparatus to bring into reality such a video format digital data storage system for use with video signal storage media such as the laser optical disc.

The present invention satisfies this need.

SUMMARY OF THE INVENTION

The present invention resides in a method and apparatus for encoding a plurality of bytes of digital data into a further plurality of bits suitable for storage in a storage medium, and for recovery therefrom, and for decoding the stored bits retrieved from the storage medium, for the recovery of the encoded bytes.

According to one aspect of the invention, the digital data bytes are arranged into a plurality of code blocks, each having a first predetermined number of columns and a second predetermined number of rows of bytes. A parity block of bytes of data is generated having a number of columns and a number of rows of bytes corresponding to the first predetermined number of columns and to the second predetermined number of rows of bytes, respectively, of the code blocks, the bits of data in the parity block corresponding to the computed parity of the combined corresponding bits in each of the code blocks. Secondly, a parity row of bytes of data are generated for each of the data blocks such that each bit in each byte in the parity row corresponds to the computed parity of the combined corresponding bits in each byte in the column of the associated data block of that parity row. Each such row of parity bytes is added to its associated block. Thirdly, a correction control word is generated for each 8 bit byte of data blocks, parity rows and parity blocks, and is added to its associated byte to form a composite word. The bits of data of all such composite words for all of the blocks are interleaved according to a matrix having a third predetermined number of rows and a fourth predetermined number of columns, and the interleaved data is provided in serial arrangement for storage.

According to another aspect of the invention, a plurality of bits encoded in accordance with the above aspect of the invention are decoded into the corresponding digital data bytes. The bits of data are disinterleaved according to the reverse of the abovementioned predetermined matrix into the aforementioned composite words. It is then determined if a bit error exists in one of the composite words and, if such an error does exist, the bit error is corrected by way of a first correction step using the correction control word. If more than a one bit error exists in a composite word a second correction step is performed using the parity row of bytes. If those more than one bit errors cannot be corrected using the row of parity bytes, a third correction step is performed using the parity block of bytes.

The present invention is particularly suited for application to laser optical discs, because the error correction scheme implemented in accordance with the present invention is especially powerful in correcting the kinds of data errors which are frequently found in connection with the use of laser optical discs, as opposed to other storage media such as magnetic tape or magnetic discs. For example, burst errors occur relatively frequently in data retrieved from laser optical discs, as compared with magnetic storage media, and the error correction scheme according to the present inventon is quite powerful in correcting such errors.

In addition, the encoding and decoding scheme provided in accordance with the present invention permits substantially real time decoding and error correction of the encoded data as it is retrieved from the disc. Previously proposed schemes require substantial buffering of the retrieved data to effect error correction, which causes delay in the ultimate access to the corrected data and added cost for the buffer. The substantially real time decoding and error correcting power provided by the present invention thus represents a significant improvement in the art.

It will be appreciated from the foregoing that the present invention represents a significant advance in the field of digital data storage systems. In particular, it provides a practical and reliable error correction scheme which enables the substantially real time correction of errors frequently introduced in the storage and recovery of data in connection with high density storage media such as the laser optical disc. Other aspects and advantages of the invention will become apparent from the following more detailed description taken in conjunction with the accompanying drawings.

BRIEF DESCRIPTION OF THE DRAWINGS

FIG. 5 is a numerical matrix useful in understanding the interleaving scheme of the preferred embodiment of the present invention.

DETAILED DESCRIPTION OF THE PREFERRED EMBODIMENT

The preferred embodiment of the present invention is adapted specifically for use in connection with the storage of digital data on a laser optical disc.

Laser optical discs have already been demonstrated to be effective storage media for the recording and later playback of encoded video and associated audio signals. A significant commercial utilization of the laser optical disc has been in connection with the recording of motion pictures for playback in the home on one of several kinds of commercially available laser optical disc players. The laser optical disc has, however, also been developed for industrial applications as well. Industrial laser optical disc players have extended capabilities, as compared with consumer players, and can, for example, be programmed to implement any of several different playback modes, such as repeat frame, fast motion forward and search. In fact, such industrial laser optical disc players can be programmed specially for a particular optical disc by storing the digital data corresponding to a desired program in an initial portion of audio stored on the disc. The program can then be read off of the disc prior to the playback of the remainder of the program video recorded thereon, and stored in the digital memory of the player where it can be accessed for execution in connection with the playback of the program video. However, this kind of scheme has heretofore not been considered practical for use in connection with the storage for later playback of computer digital data because of the relatively strict error rate requirements placed by computer systems. Recovered data from laser optical discs is subject to a relatively high frequency of occurrence of errors of a form known as "burst" errors which destroy entire groups of bits, rather than single bits throughout the stream of data.

However, the recording of digital data in the video channel of a laser optical disc offers several advantages. First, existing laser optical disc video player technology can be used. In fact, the recording frequencies can be kept in the video range so that existing commercial optical disc players can be used without special modifications to the players. Second, both digital data and picture video recorded on the same laser optical disc. Third, the high frequency (3.58 MHz in NTSC or 4.43 MHz in PAL) color burst signal can be used to synchronize a decoder clock using conventional integrated circuits, thereby eliminating the need for a special phase lock loop tracking the data.

Figure 1:
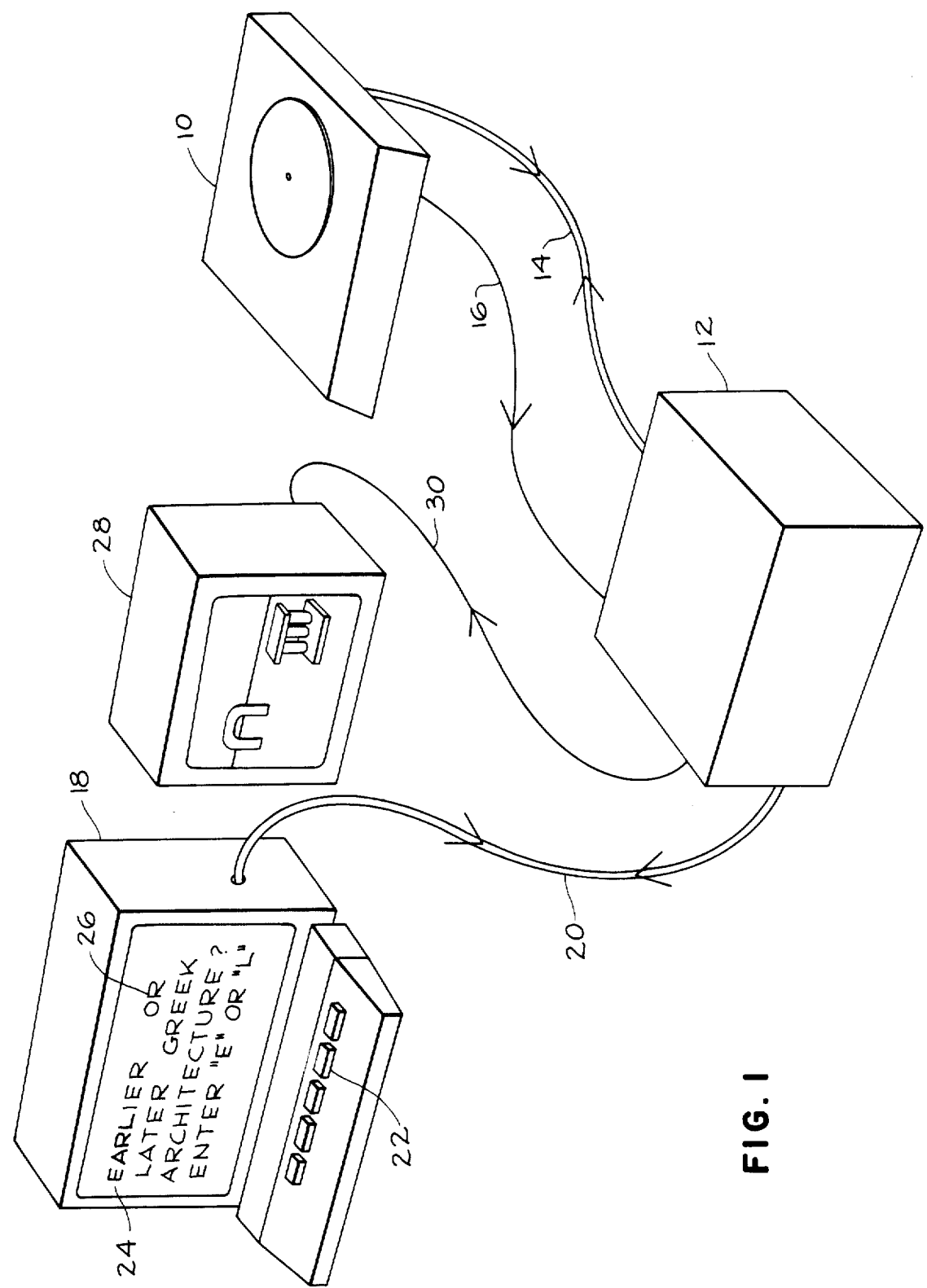
FIG. 1 is a pictorial representation of an application of the preferred embodiment of the present invention.

One arrangement, which involves the recording of both digital data and picture video on the same disc, is shown schematically in FIG. 1. An optical disc player 10 is connected to a decoder unit 12 by way of control lines 14 and a recovered video signal line 16. Details of the decoder unit 12 are provided below.

The decoder unit 12 is connected to a small computer 18 by way of control lines 20. The computer 18 can be, for example, a home microcomputer of the type which has a keyboard 22 and CRT monitor 24 for the display thereon of alphanumeric characters 26.

A conventional television monitor 28 is also connected to the decoder device 12 by way of a video signal line 30. If desired the alphanumeric characters 26 may be added to the video signal and displayed directly on the monitor 28, in addition to, or instead of, on the monitor 24.

In operation, the video level signals are read off a laser optical disc by the player 10, and the video level signals recovered thereby, which include both digital data and picture video, are supplied to the decoder unit 12. The decoder unit 12 sends control signals along line 14 to the player 10 to control the location on the laser optical disc where the signals are read. The player 10 sends signals back along line 14 which inform the decoder unit 12 where on the disc signals are being read.

The decoder unit 12 extracts the digital data portion of the signals on line 16 and provides it to the computer 18 by way of line 20. This digital data can include a program which is readable by the computer 18 and which includes encoded alphanumeric characters for display on CRT 24. The picture portion of a frame of video can be displayed on the television monitor 28 in a repeat frame mode or any normal display mode. The program stored in computer 18, including desired encoded alphanumeric characters for display on CRT display 24 for a particular frame, can be coordinated with the picture display for that frame or scene. The alphapicture numeric characters can be in the form of a question calling for entry of an appropriate answer by way of keyboard 22. The program stored in computer 18 can include subroutines which recognize the keyboard entry and in response provide further alphanumeric characters, such as an indication of the accuracy of the answer included in the keyboard entry. Techniques for such interactive programming are known.

It should be understood that the system depicted in FIG. 1 is exemplary only. Other arrangements are possible in accordance with the present invention. For example, a player 10 and decoder 12 can be used in connection with high density digital data storage and read out for a larger computer, such as a main frame computer.

In accordance with the preferred embodiment of the present invention for use with NTSC video format equipment, data is stored on a laser optical disc on a frame-by-frame basis. Up to 23 blocks of digital information, plus an additional block of error correction bits, are stored in each video frame. These blocks of data are distributed throughout the frame in groups of fourteen words of digital data each of which is stored on the video portion of the signal corresponding to a horizontal line of television information.

Each video frame stored on the laser optical disc can contain either total picture video, total digital video or a mixture of both. The particular arrangement of picture video and digital video for each of the two fields in the frame is described in several numbers recorded in line 22 of that field. The first number, in the range 0–221, describes the first line of the field which contains digital information, while the second, in the range 0–24, contains the number of two hundred seventy-two byte data blocks which are stored in that field. The remainder of that field is assumed to be picture video.

The digital data which is stored on the laser optical disc is specially encoded, according to the preferred embodiment of the present invention, in a manner which will now be described.

Figure 2:
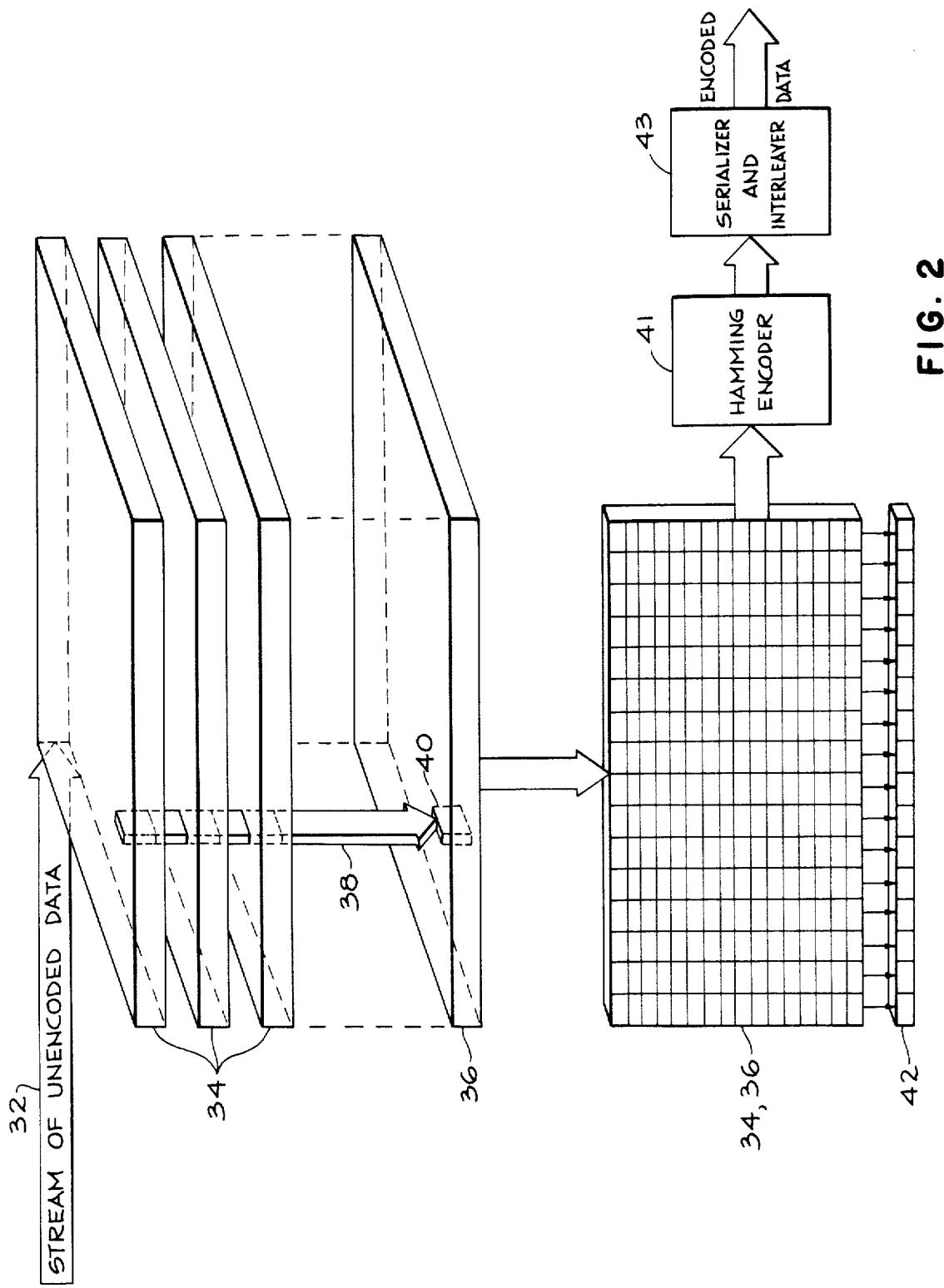
FIG. 2 is a schematic representation of the data encoding scheme of the preferred embodiment of the present invention.

Referring to FIG. 2, a schematic representation of the encoding process is depicted. The data to be encoded begins in the form of up to 5,888 eight bit bytes provided as a stream 32 of data to be encoded. These 5,888 bytes are arranged in up to twenty-three blocks 34 of data, each block having sixteen rows and sixteen columns, thus two hundred fifty-six bytes per block.

An additional block of two hundred fifty-six bytes of data, also having sixteen rows and sixteen columns is generated as follows. If one were to imagine all of the blocks 34 of data to be encoded to be stacked up one on top of the other as depicted in FIG. 2, each bit occupying the same location within a block would stack up one on top of the other. The solid arrow section 38 is included in FIG. 2 to aid in visualizing the grouping of bits located in an identical position within each of the blocks 34. It is possible to imagine an arrow section 38 passing through each such bit location within all of the blocks 34. The corresponding bit 40 in block 36 for the bits included within an arrow segment 38 is the computed parity bit for all of the corresponding bits located in data blocks 34 at the location corresponding to the location of parity bit 40 in block 36. Each of the 2,048 bits in parity block 36, denominated the Frame Error Correction Code ("Frame ECC") block, is derived in this way. The reason for the denomination of block 36 as the "Frame Error Correction Code" block is described below.

Assuming that the total amount of unencoded data 32 to be encoded is the maximum possible, that is 5,888 bytes, following the encoding step just described the data will be in the form of twenty-four blocks, each such block having sixteen rows and sixteen columns of bytes. This gives a total of 6,144 bytes.

In the next step, all blocks of data, that is each of the unencoded data blocks 34, plus the Frame ECC block 36, are further encoded by the addition to each such block 34, or 36, of a single additional row 42 of bytes of parity bits denominated the Block Error Correction Code ("Block ECC") row. Each parity bit within row 42 is the computed parity for all bits in each row of the block 34, or 36 occupying the same bit position within those rows that the parity bit occupies within row 42. The reason that row 42 of data is denominated the "Block ECC" row of data is explained below.

It will be appreciated that although the parity bit calculations in both of the steps described above are done on a bit-by-bit basis, the bits in block 36 and within each row 42 of the blocks 34, or 36, are arranged as 8 bit bytes. This arrangement into bytes is to permit the next level of encoding, described below, to be applied to all of the data generated in accordance with the encoding steps heretofore described.

Following the generation of the Block ECC row 42 of bytes, all of the bytes of data generated in accordance with the two steps described above have added thereto by an encoder 41 five additional bits of data denominated "Correction Control bits", in accordance with the Hamming encoding and parity processes. The additional, Correction Control bits are added to each byte of data, and each byte is thus expanded to form a composite word.

All of the composite words are then applied in ordered arrangement to a Serializer and Interleaver 43 where the composite words of data are arranged in serial form and are interleaved in a process described below. The data emerging from the serializer and interleaver block 43 comprises the completely encoded data according to the preferred embodiment of the present invention.

Figures 3, 4:
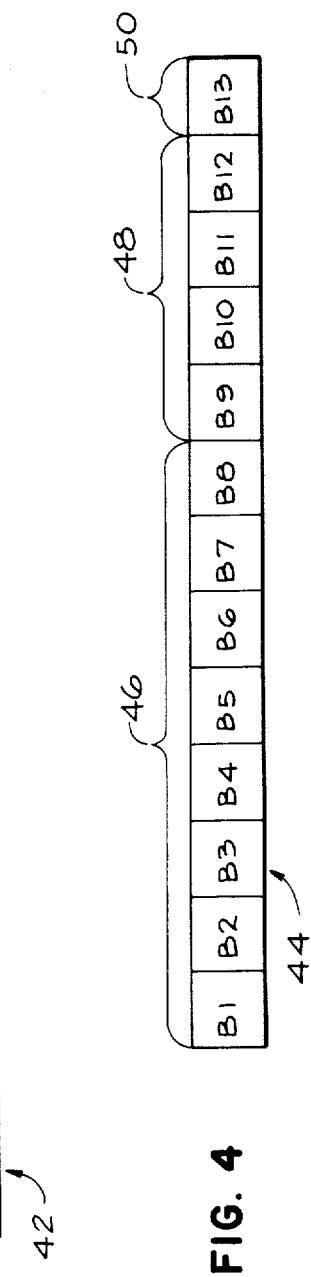
FIG. 3 is a schematic representation of a block of data generated in the encoding scheme depicted in FIG. 2.
FIG. 4 is a schematic representation of a composite word of data generated in the encoding scheme depicted in FIG. 2.

FIG. 3 is a schematic representation of a block 34, or 36, of data, prior to being encoded in the Hamming Encoder 41 (FIG. 2). Each small rectangle W1, W2, etc., comprises a byte of digital data. As can be seen, the block 34, or 36, is divided into sixteen rows and sixteen columns of bytes.

Bytes PW1, PW2, etc., of the "Block ECC" row 42 of bytes are, like bytes W1, W2, etc., comprised of 8 bits each.

FIG. 4 is a diagram of a composite word 44 after being encoded by Hamming encoder 41 (FIG. 2). The word 44 comprises a first portion 46 of 8 bits (B1–B8) comprising, in the case of the original data block 34, the 8 bits of the bytes of unencoded data 32, and in the case of the computed "Frame ECC" block 36, the 8 bits of computed parity for the corresponding bits in blocks 34 in those bit locations within block 36. Word 44 also comprises a further portion 48 containing Correction Control bits of four additional Hamming code bits (B9–B12) computed based on the 8 bits (B1–B8) in the first portion 46 of the word 44. Finally, a parity bit portion 50, comprising a single bit, which is the computed parity value of bits B1–B12 (B13), is provided at the end of word 44. Word 44, with all of its three sections 46, 48, 50, is, as mentioned above, denominated a composite word. Hamming encoding is, per se, a known technique for error control coding of digital data. For example, the book *Error-Control Coding and Applications*, by Djimitri Wigtert, Artech House Inc., 1978, is one of several texts which can be found on the subject which include a description of the Hamming code. Because the Hamming code is considered well known in the art, and for the further reason that a large body of textual material may be easily found on the subject, the theory of Hamming code is not described in detail herein.

The generator matrix for the Hamming code implemented in the preferred embodiment of the present invention is given as follows:

| G(X) = | | | | | | | | | | | |
|---|---|---|---|---|---|---|---|---|---|---|---|
| 1 | 0 | 0 | 0 | 0 | 0 | 0 | 0 | 1 | 1 | 1 | 0 |
| 0 | 1 | 0 | 0 | 0 | 0 | 0 | 0 | 0 | 1 | 1 | 1 |
| 0 | 0 | 1 | 0 | 0 | 0 | 0 | 0 | 1 | 0 | 1 | 0 |
| 0 | 0 | 0 | 1 | 0 | 0 | 0 | 0 | 0 | 1 | 0 | 1 |
| 0 | 0 | 0 | 0 | 1 | 0 | 0 | 0 | 1 | 0 | 1 | 1 |
| 0 | 0 | 0 | 0 | 0 | 1 | 0 | 0 | 1 | 1 | 0 | 0 |
| 0 | 0 | 0 | 0 | 0 | 0 | 1 | 0 | 0 | 1 | 1 | 0 |
| 0 | 0 | 0 | 0 | 0 | 0 | 0 | 1 | 0 | 0 | 1 | 1 |

The parity check matrix is:

| H = | 1 | 0 | 1 | 0 | 1 | 1 | 0 | 0 | 1 | 0 | 0 | 0 |
|---|---|---|---|---|---|---|---|---|---|---|---|---|
| | 1 | 1 | 0 | 1 | 0 | 1 | 1 | 0 | 0 | 1 | 0 | 0 |
| | 1 | 1 | 1 | 0 | 1 | 0 | 1 | 1 | 0 | 0 | 1 | 0 |

| -continued |   |   |   |   |   |   |   |   |   |   |   |
|---|---|---|---|---|---|---|---|---|---|---|---|
| 0 | 1 | 0 | 1 | 1 | 0 | 0 | 1 | 0 | 0 | 0 | 1 |

The Hamming code implemented in the preferred embodiment described herein is a (15,11) single bit error correction code expressed as $G(X)=X^4+X+1$. This is shortened to (12, 8) and then a parity bit is added to make a (13,8) code. Given the above information, one having ordinary skill in this art can derive according to the known principles of Hamming encoding the four Hamming code bits for all possible combinations of eight digital binary bits. A novel method and apparatus for implementing this encoding process and the addition of parity bit 50 is described below.

FIG. 5 is a 14×13 matrix of sequential integers from 0 through 181, which is useful in understanding the interleaving aspect of the preferred embodiment of the present invention. In this process of interleaving, all of the bits to be stored on a single line of video that is, 14 composite digital words, each having 13 bits, comprising a total of 182 bits, are written bit-by-bit into a memory in sequential arrangement as depicted in FIG. 5. It will be appreciated that the bits are written in serially from left to right and top to bottom until the matrix is filled.

However, when the bits are read out they are read out not by rows, but rather by columns, as depicted by the numerically identified row of arrows 54 above the matrix 52 in FIG. 5. The columns are read out of memory in the sequence indicated by the numerical identifiers in row 54. Thus, the bits are read out in the sequence; 0, 14, 28, 42, 56, etc., until all of column 1 is read out, and then proceeding, 1, 15, 29, 43, etc.

It will be appreciated that any "i" integers can be interleaved in an "m"×"n" matrix, where "m" and "n" are both integers. The above 14×13 matrix was chosen for this, the preferred embodiment of the present invention, because fourteen 13-bit words are stored in each video line. Other matrices may be used in connection with the present invention, and may be preferred in other formats, for example other data densities per video line. Selection of alternative matrices is considered well within the scope of one skilled in this art once the principles of the present invention, described herein, are understood.

The bits are stored on the laser optical disc in serial arrangement in the sequence arrived at by way of the interleaving process just described. In this way, if a burst error destroying 14 consecutive bits occurs as a result of the storage and read out of the data bits, the resultant distribution of error bits in the fourteen composite words stored on the line will be one error bit per composite word since the bits will be read from the disc sequentially by the column and the words are written sequentially by the row. Only one error bit in each of fourteen consecutive composite digital words is well within the error correction capability of even the first level error correction described below.

The bits of data to be stored are encoded according to a four level video signal arrangement of bit cells, comprising two data bits per cell, wherein the bit cells occur at a rate of one half of the television color carrier frequency. This method of encoding is known, being the subject of U.S. patent application Ser. No. 218,584, filed Dec. 19, 1980. The data is recoverable as a serial stream of binary digital data bits.

As previously mentioned, the data is stored in groups of fourteen 13-bit words, comprising a total of one hundred and eighty two bits. These one hundred and eighty two bits are stored on separate lines of video. Up to two hundred and forty lines in each field of a frame of video can be thus encoded with digital data.

It should be understood in connection with the above description of the arranging of data and generation of additional bits of data in the encoding scheme of the preferred embodiment of the present invention that the various data structures, i.e., blocks, rows, columns, and matrices, are not necessarily representative of actual physical structures within an electronic device implementing the scheme, but rather are conceptual tools to aid in understanding how the encoding and decoding circuitry of the present invention serve to implement the stated function, that is, to provide an error correction scheme capable of correcting errors in data retrieved from video format signals stored on storage media such as laser optical discs.

The foregoing description in connection with FIGS. 2 through 5 explains the arrangement of data after encoding and as it is provided to further circuitry for placement between the horizontal sync intervals of a standard video format signal. Details of circuitry which implement this encoding are described below.

Because the decoding and error correction implemented in connection with the retrieved data is best understood in connection with the process implemented on it, the explanation of the error correction process is described below in detail in connection with the description of the decoder circuitry of the preferred embodiment of the present invention.

Figure 6:
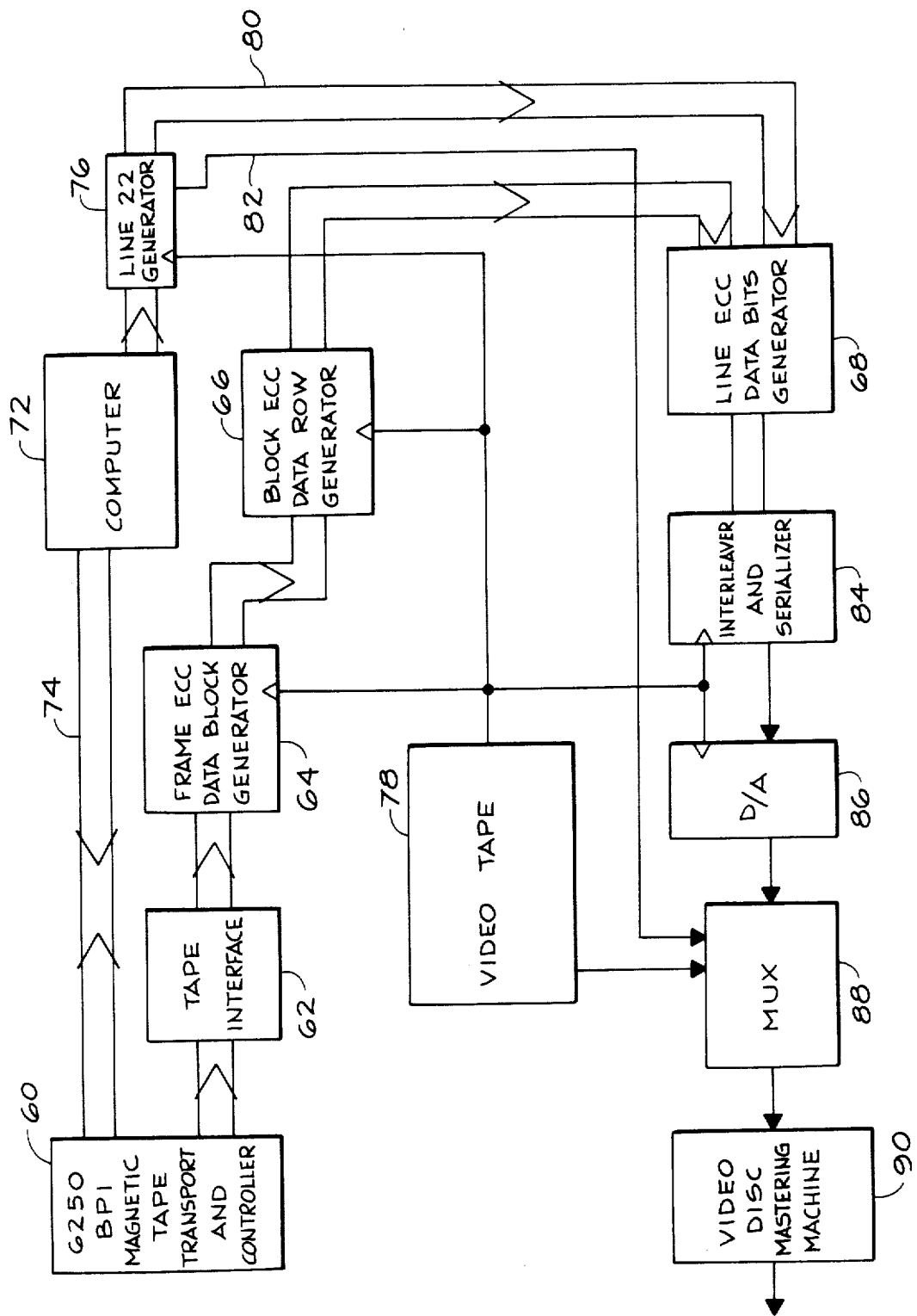
FIG. 6 is a block diagram of a digital data storage system including an encoder constructed according to the principles of the preferred embodiment of the present invention.

Turning now to FIG. 6, a block diagram of the encoder circuitry of the preferred embodiment of the present invention is shown. Data to be encoded is provided to the circuitry by way of a 6250 bytes-per-inch, nine track magnetic tape transport and controller 60. Such a device is well known in the art and is not described in detail herein. Tape transport and controller 60 provides eight bit bytes in parallel format at 6250 BPI, having an error rate rarely exceeding 1 in $10^{10}$.

A computer 72, which can be a standard home or small business microcomputer, communicates by way of a data bus 74 with the tape transport 60. The computer 72 controls the tape transport 60 and monitors the data output therefrom in connection with the coordination of the flow of data in the system shown in FIG. 6.

Computer 72 outputs data to a "Line 22" Generator 76. "Line 22" Generator 76 is also connected to a video tape player 78, and receives synchronizing signals therefrom. "Line 22" generator 76 receives data from computer 72 containing information including the frame number, the field number, the starting video line within a particular field on which the digital data stored in that field appears, and concerning the number of lines within that field on which the digital data is stored in terms of the number of blocks to be recorded in that field. Generator 76 generates digital code words including this information for insertion on TV line 22 of the field to which the information pertains. These data words are outputted from generator 76 on a data bus '80'.

The "Line 22" generator also generates a control signal during the active video portion (the portion following the synchronization signals and color burst during which video picture information is usually carried) of TV line 22 of the active frame and supplies that signal on a signal line 82. Lines 80 and 82 are discussed in further detail below.

The eight bit parallel data from tape transport 60 is provided to the input of a tape interface 62. Tape interface 62 is based on a 768×8 FIFO (first in-first out register) which receives the bytes of data as they are delivered from tape 60 and provides them to the rest of the encode c at the internal clock rate of the encoder circuit. It thus acts as a timing buffer for the bytes of data provided by tape transport 60. The time buffered data from tape interface 62 is provided to a frame ECC data block generator 64. Frame ECC data block generator 64 generates the block 36 of parity bits described above in connection with FIG. 2.

The data outputted from tape interface buffer 62 or from generator 64 is provided to the input of a "block ECC" data row generator 66 in the appropriate sequence. Block ECC data row generator 66 generates for each of the data blocks 34, 36, the row 42 of parity bits described above in connection with FIG. 2.

The data outputted from generator 66 is provided to one input of a line ECC data bit generator 68.

The other input of line ECC data bits generator 68 is connected to data line 80 from the "Line 22" Generator 76, described above. Line ECC data bits generator 68 generates the Hamming code data bits 48 and single parity bit 50 (FIG. 4) for each digital data byte applied thereto.

The Frame ECC, Block ECC and Line ECC data bytes are outputted from generator 68 and applied to a novel Interleaver and Serializer 84. Interleaver and Serializer 84 interleaves the bytes or data applied thereto in accordance with the 14 by 13 matrix described above in connection with FIG. 5, and outputs the interleaved data as a serial stream of bits to the input of a Digital to Analog Converter 86.

Converter 86 receives the serialized data from Interleaver and Serializer 84 and converts the bits of data into analog, video level signals. These analog signals are applied to a first input of a two input multiplexer 88.

Multiplexer 88 selects between the encoded data outputted from Digital to Analog Converter 86, and picture video outputted from the video tape player 78 mentioned above. Control signals for the selection by multiplexer 88 are received on line 82 from the "line 2" generator 76 described above. As mentioned above, generator 76 provides a control signal on line 82 during the active video portion of line 22. Generator 76 also provides on line 82 control signals during the active video portion of the video lines, beginning at the first line on which data is stored and ending at the last line in which data is stored in each field, and this signal is used to control multiplexer 88 to provide the aforementioned selection.

Timing control for blocks 64, 66, 76, 84 and 86, described above, are provided by video tape player 78 in the form of TV H synchronization V sync, and color carrier frequency signals.

The output of multiplexer 88 is applied to a videodisc mastering machine 90 which encodes the information as FM signals which are stored on a laser optical disc.

Figure 7:
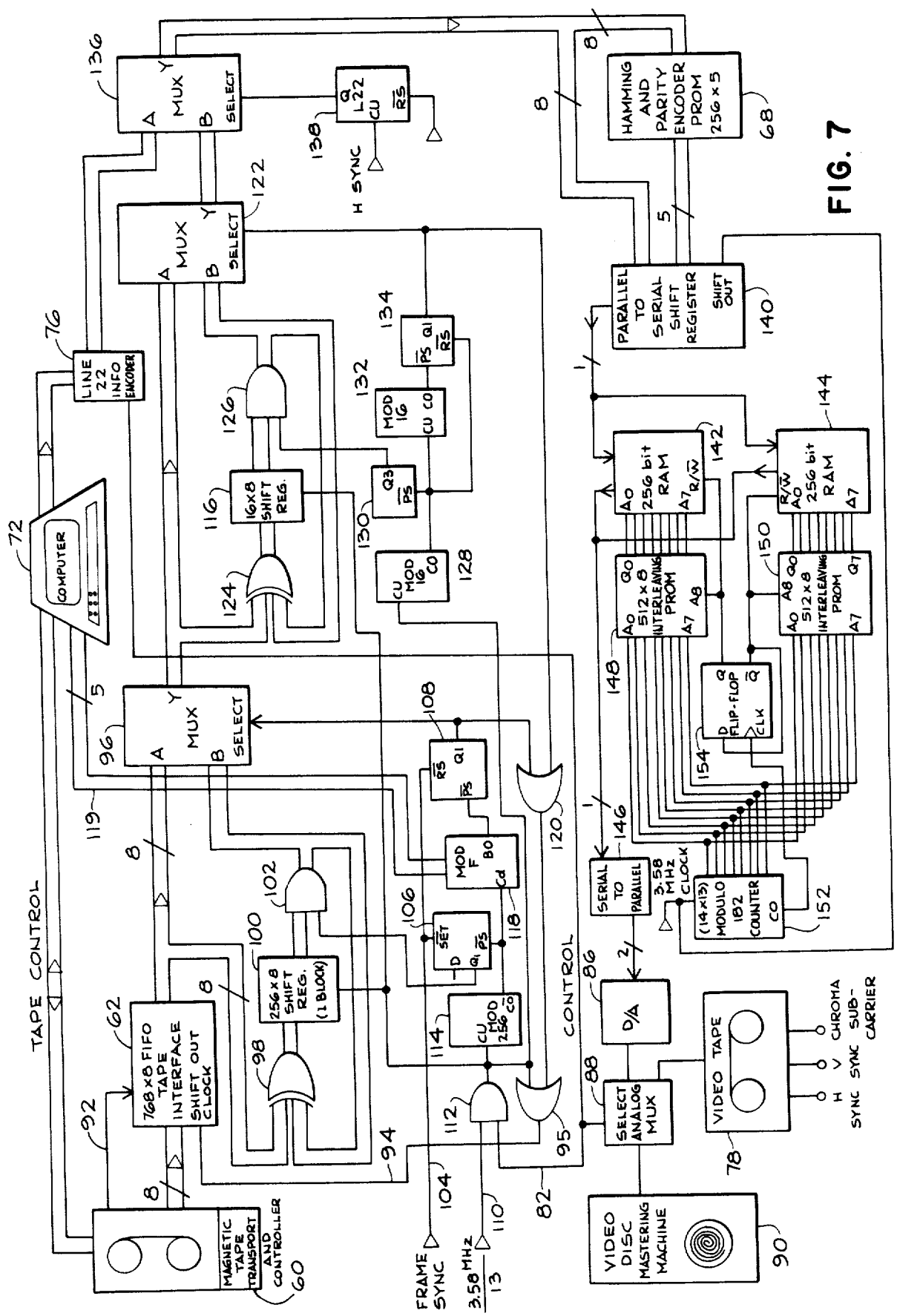
FIG. 7 is a circuit diagram of the system depicted in FIG. 6.

FIG. 7 is a schematic diagram of the circuit shown in block diagram form in FIG. 6. The magnetic tape transport and controller 60 provides data to the tape interface FIFO 62 under the control of the computer 72, as described above. Write pulses for FIFO 62 are provided on a signal line 92. SHIFT OUT clock pulses are provided on a further line 94 from an OR Gate 95 described below. The data clocked out of FIFO 62 is simultaneously applied to the "A" input of a multiplexer 96 and to one set of inputs of eight Exclusive OR Gates 98 shown diagrammatically as one gate.

The output of Exclusive OR Gates 98 are applied to the input of a 256×8 shift register 100. The output of shift register 100 is applied to one input of eight two input AND Gates 102 also shown as one gate. The outputs of AND Gates 102 are simultaneously applied to the other set of inputs of exclusive OR Gate 98 and to the "B" input of multiplexer 96.

Digitized television FRAME SYNC pulse signals are applied on a signal line 104 to a first flip-flop 106 and a second flip-flop 108. Line 104 is connected to the $\overline{\text{SET}}$ input of flip-flop 106 and to the $\overline{\text{RESET}}$ input of flip-flop 108. A square wave having a frequency equal to 1/13 the chroma frequency of the video on which the data is encoded by the encoder circuit of FIG. 7 is applied on a further signal line 110 which is connected to a first input of an AND gate 112. The second input of AND gate 112 is connected to signal line 82 from "Line 22" Encoder 76. It will be recalled that line 82 contains signals which are active only during those portions of the video to be mastered which contain digital data. The square wave signal applied on line 110 is the byte clock signal for the system. Thus, the combined action of line 82 ahd line 110 in connection with AND gate 112 is to gate system byte clock signals to the output of AND Gate 112 in bursts corresponding to the desired time intervals in the system video in which digital data is to be encoded.

The output of AND Gate 112 is applied to one input of OR Gate 95, to the COUNT-UP input of a count-up counter 114, to the CLOCK input of shift register 100, and to the CLOCK input of a further shift register 116. The $\overline{\text{CARRYOUT}}$ output of count-up counter 114 is connected to the $\overline{\text{PRESET}}$ input of flip-flop 106 and to the COUNT-DOWN input of a count-down counter 118. The BORROW output of count-down counter 118 is connected to the $\overline{\text{PRESET}}$ input of flip-flop 108. The $Q_1$ output of flip-flop 106 is connected to the remaining inputs of AND gates 102. The $Q_1$ output of flip-flop 108 is connected to the select input of multiplexer 96 and to one input of an OR gate 120.

In operation, Exclusive OR Gates 98, shift register 100, AND Gates 102 and multiplexer 96 operate in conjunction with the associated counters, flip-flops and AND Gates described above to generate the frame ECC data block. Specifically, elements 98, 100, 102, 96, 112, 114, 106, 108, and 118 comprise the Frame ECC data block generator 64 (FIG. 6).

It will be recalled that the Frame ECC data blocks comprises a block of bits, each bit comprising the parity bit of all bits similarly located in the blocks of data to be encoded. As is known, a parity bit can be generated for a given number of bits by subjecting all of those bits to an Exclusive OR operation with one another. It will be further recalled that each encoded data block comprises two hundred fifty-six 8-bit bytes. Shift register 100, it will be noted, has a capacity of 256 bytes of 8 bits.

In operation, a group of two hundred fifty six bytes of data is initially shifted unaffected into shift register 100, passing through Exclusive OR Gate 98. The output of AND gates 102 are all 0's initially. The data is also simultaneously passed through multiplexer 96.

The second block of two hundred fifty six 8-bit bytes of data is then shifted into shift register 100 through Exclusive OR Gates 98, being subject to an exclusive OR operation with the previous block of data now shifted out of shift register 100 through AND Gates 102. Thus, as the next 256 bytes, comprising the next data block, are clocked out of FIFO 62 through multiplexer 96, two hundred fifty six bytes, comprising the computed parity of all like bits in each of the two blocks, are clocked into shift register 100. The process is repeated for each of the total of a maximum of 23 blocks of data bytes or the number of data blocks to be recorded on that particular frame, as defined by the number 'F' loaded into countdown counter 118 from computer 72 via line 119, and the bytes which remain in shift register 100 following the clocking of the last block of bytes out of FIFO 62 and through Exclusive OR Gate 98, comprise the computed parity bytes of the Frame ECC data block 36 (FIG. 2).

The next clock pulse on signal line 110 causes the $Q_1$ output of flip-flop 108 to go high, causing multiplexer 96 to select the "B" input. The SELECT input of multiplexer 96 is held high for the time it takes to shift all 256 bytes out of shift register 100. During this time the SHIFT OUT clock input of FIFO 62 is also held high, thus inhibiting further transfer of data while the Frame ECC data block passes through multiplexer 96.

At the beginning of the subsequent frame, a frame sync pulse appears on line 104 triggering the $\overline{SET}$ input of flip-flop 106 causing a low state to occur at the $Q_1$ output of flip-flop 106, thus inhibiting the flow-through of data through AND Gates 102 as the first block of data is being shifted into shift register 100. This causes the previously computed parity bytes for the last previous frame set of blocks to be destroyed, and also prevents those bytes from being Exclusive OR-ed with the first block of incoming data in the subsequent group of blocks.

The output of multiplexer 96 is applied to the "A" input of a further multiplexer 122 and to one set of inputs of eight further Exclusive OR Gates 124 shown as one gate in FIG. 7. The output of Exclusive OR Gates 124 are connected to the input of shift register 6 which is a 16 long × 8 wide shift register. The output of shift register 116 is connected to one set of inputs of eight AND Gates 126 shown as one gate, the output of which are connected to the "B" input of multiplexer 122 and to the second set of inputs of Exclusive OR Gates 124.

The output of AND Gate 112 is connected to the COUNT-UP input of a "modulo 16" counter 128, the CARRYOUT output of which is connected to the $\overline{PRE\,SET}$ input of a flip-flop 130, to the count-up input of a further modulo 16 counter 132, and to the $\overline{RESET}$ input of a further flip-flop 134. The CARRY-OUT output of counter 132 is connected to the $\overline{PRESET}$ input of flip-flop 134, and the $Q_1$ output of flip-flop 134 is connected both to the SELECT input of multiplexer 122 and to the other input of OR Gate 120.

Elements 124, 116, 126, 122, 128, 130, 132 and 134 together comprise the Block ECC data row generator 66 (FIG. 6). These elements perform analogously to the previously described elements which comprise the Frame ECC data block generator 64. However, since the Exclusive OR operation by way of Exclusive OR Gates 124 is performed on groups of sixteen, rather than in groups of two hundred fifty six, as is the case with Exclusive OR Gates 98, the remaining sixteen bytes of data in shift register 116 following a complete cycling of two hundred fifty-six data or 'frame ECC' bytes comprise the computed parity bits for all similarly located bits of data in each row of the current block being processed. All blocks of data or 'frame ECC' passed through multiplexer 96 have such a row of parity bit bytes computed through this cycling action through Exclusive OR Gates 124, shift register 116 and AND Gates 126.

After all sixteen rows of bytes i.e., 256 bytes, of data of a block are clocked out of FIFO 62 or shift register 100, through multiplexer 96 and through multiplexer 122, the $Q_1$ output of flip-flop 134 goes "high", causing multiplexer 122 to select the "B" input, and also holding the SHIFT OUT clock input of FIFO 62 high, for the duration of the time it takes to shift all sixteen parity bytes out of shift register 116 and through multiplexer 122. This is analogous to the function of the $Q_1$ output of flip-flop 108 described above.

The output of multiplexer 122 is connected to the "B" input of a further multiplexer 136. The "A" input of multiplexer 136 is connected to the output of "Line 22" Information Encoder 76. The select input of multiplexer 136 is connected to the Q output of a count-up counter 138, which counts horizontal sync pulses applied to the COUNT-UP input thereof, after being reset by Field Sync pulses every field. Counter 138 causes multiplexer 136 to select the "A" input thereof during the active video portion of video line 22. The encoded information including the frame number, the field number, the starting video line for the encoded bytes of digital data, and the total number of blocks of digital data in that field is thus inserted in the active video portion of video line 22 of every field.

The output of multiplexer 136 is applied both to the address input of a Hamming and Parity Encoder PROM 68 and to the $A_0$ through $A_7$ parallel inputs of a Parallel IN Serial OUT shift register 140. The five parallel bit lines output of PROM 68 are applied to the $A_8$–$A_{12}$ inputs of shift register 140.

The arrangement of PROM 68 and shift register 140 comprises a novel means for encoding in substantially real time bytes of data by means of a block code, such as according to the Hamming code. PROM 68 is programmed such that the stored bits in PROM 68 at the various storage locations therein occupy addressable storage locations, the addresses of which comprise the data bits to which the bits of stored data correspond as the Hamming code bits thereof. Thus, in order to program PROM 68, the four Hamming code bits and the single parity bit for all possible combinations of 8 bits are computed as described above. The computed Hamming and parity bits are then programmed into storage in PROM 68 at storage locations having addresses which equal the combination of eight bits for which the Hamming code and parity bits were computed. In this way, as the eight bits of data outputted from multiplexer 136 are applied to the address inputs of PROM 68, the computed Hamming and parity bits are immediately provided at the output of PROM 68 for combination with the eight bits of data to form the composite digital word described above. These thirteen bits can then be immediately shifted out of shift register 140 in a serial bit stream. Alternatively, the bits stored in PROM 68 can be all thirteen bits of the composite word for the data byte which addresses the stored bits; no combination of the accessed bits with the addressed byte bits external to the PROM 68 is required in such an alternative embodiment.

The bits are clocked out of shift register 140 at the frequency of the system chroma signal. They are applied to the inputs of each of two RAMs 142, 144. The outputs of RAMs 142 and 144 are both connected to the SERIAL input of a Serial to Parallel Converter 146.

The $A_0$ through $A_7$ address inputs of RAM 142 are connected to the $Q_0$ through $Q_7$ outputs of a 512×8 interleaving PROM 148. The contents of this PROM 148 are described below. The $A_0$ through $A_7$ address inputs of RAM 144 are connected to the $Q_0$ through $Q_7$ outputs of a further interleaving PROM 150, the contents of which are also described below. The $A_0$ through $A_7$ address inputs of both PROMs 148 and 150 are connected to the $Q_0$ through $Q_7$ outputs of a modulo 182 counter, the CLOCK input of which is connected to the same chroma system clock input as is connected to the SHIFT OUT input of shift register 140. The CARRY OUT output of counter 152 is connected to the CLOCK input of a D-flip-flop 154. The Q output of flip-flop 154 is connected to the $A_8$ address inputs of PROM 148 and to the READ/WRITE input of RAM 142. The $\overline{Q}$ output of flip-flop 154 is connected to the $A_8$ address input of PROM 150 and to the READ/WRITE input of RAM 144. The $\overline{Q}$ output of flip-flop 154 is also connected to the D input of flip-flop 154.

Block 140, 142, 144, 146, 148, 150, 152 and 154 comprise the novel Interleaver and Serializer block described above in connection with FIG. 6. Together these blocks operate as follows. In response to the pulses of the system chroma clock, the bits shifted byte-by-byte into shift register 140 are also clocked alternately into RAM 142 and RAM 144 at addresses determined through the counting action of counter 152 and the programs stored in PROMs 148 and 150. The bits thus stored in rams 142 and 144 are then alternatively read out of these rams from addresses again determined through the action of counter 152 and the contents of the programs in PROMs 148 and 150. The timing of alternation between The WRITE and READ function of RAM 142 and RAM 144 is controlled through the action of the CARRY OUT output of counter 152 and flip-flop 154.

PROMs 148 and 150 are both programmed with the same program. At storage locations having addresses "0" through "181", the stored data have the same numerical values as the addresses of those locations. At storage locations having addresses "256" through "437" the PROM is programmed such that the data stored at those locations are numbers following in sequence according to the interleaving matrix readout pattern described above in connection with FIG. 5. Thus, the data at storage location address "256" has the numerical value zero, while the data at storage location address "257" has the numerical value fourteen, the data at storage location address "258" has the numerical value twenty-eight, and so forth in the interleaving readout pattern.

At the beginning of the first interleaving cycle, the modulo one hundred and eighty-two counter 152 counts up from 0 through 181. At this time, the Q output of flip-flop 154 is low, while the $\overline{Q}$ output is high. RAM 142 is thus in a WRITE mode, while RAM 144 is in a READ mode. Since the Q output of flip-flop 154 is low at this time, as counter 152 counts from 0 through 181, addresses "0" through "181" are addressed in PROM 148. It will be recalled that the data stored at those address locations is equal in value to the numerical value of those addresses. Thus the bits of data clocked out of shift register 140 are written into RAM 142 in the normal sequential sequence in a block of one hundred eighty two bits.

Following one hundred eighty two clock pulses from the system chroma clock, the CARRY OUT output of clock 152 sends a clock pulse to flip-flop 154 causing the Q output thereof to go high and the $\overline{Q}$ output thereof to go low. The $A_8$ address input of PROM 148 thus being high, as the modulo 182 counter cycles through its next count from '0' through '181' those addresses in PROM 48 having numerical value "256" through "437" are sequentially accessed. It will be recalled that those storage locations are programmed with the numerical values of the interleaving readout sequence. During this portion of the cycle the ram 142 is in the READ mode. Thus, during the second 182 clock pulses the 182 bits of data previously written into ram 142 are read out serially as data in the interleaving pattern. During this second cycle of 182 system chroma clock pulses, a second set of data is written into RAM 144 while the first set of data is being read out of RAM 142.

The interleaving process continues in groups of one hundred eighty two bits alternating in reading and writing between RAMs 142 and 144, until all bits of data have been so processed.

The Serial to Parallel converter 146 provides the completely encoded data bits to the Digital to Analog converter 86 in groups of two bits for video encoding as described above. The video encoded bits are applied to one input of multiplexer 88, the other input of which is connected to video tape player 78, as described above. The selection of inputs by multiplexer 88 is controlled by the 'Line 22' Information Encoder 76, and the output of multiplexer 88 is applied to the input of a videodisc mastering machine 90, as described above.

Figure 8:
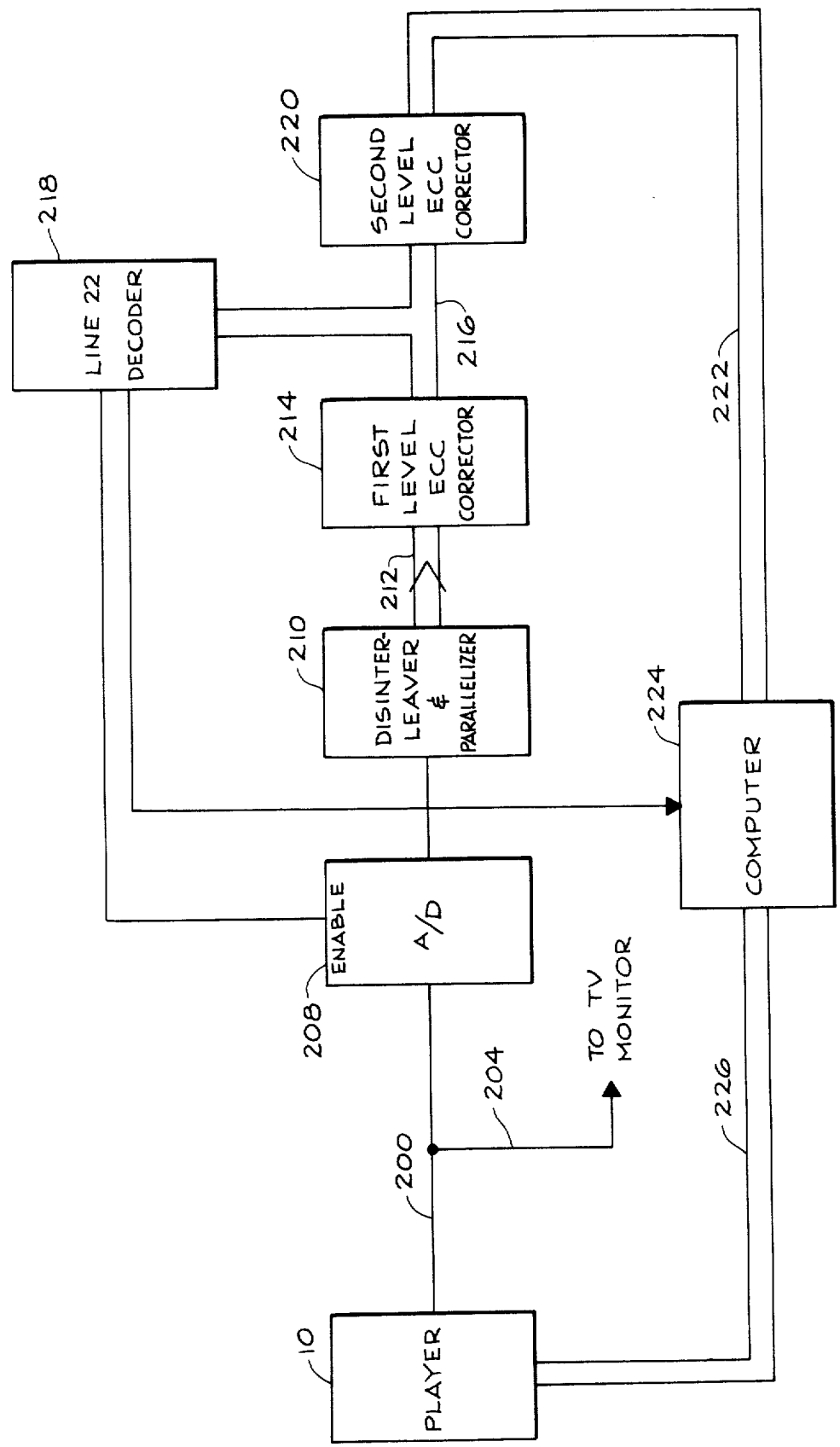
FIG. 8 is a block diagram of a data retrieval system including a decoder constructed according to the principles of the preferred embodiment of the present invention.

FIG. 8 is a block diagram of a system including a digital data decoder constructed according to the principles of the preferred embodiment of the present invention. A conventional videodisc player 10 provides demodulated video signals from a disc being played (not shown) on an output signal line 200 which is connected to the input of an analog to digital converter. It is also connected to a video signal line 204 which is connected to the input of a television monitor.

The output of Analog to Digital Converter 208 is connected to the input of a Disinterleaver and Parallelizer 210. The output of Disinterleaver and Parallelizer 210, comprising a 13-bit parallel digital data signal line is connected to the input of a First Level ECC Corrector 214.

The output of the First Level ECC Corrector 214 is connected to the input of a 'Line 22' Decoder 218 and to the input of a Second Level ECC Corrector 220. The output of Second Level ECC Corrector 220 is connected to a data bus input of a computer 222. A further data bus 226 is connected to the player 10.

A control signal bus 230 from 'Line 22' Decoder 218 is connected to a data input of computer 224.

Data is retrieved from a disc (not shown) played on player 10 and provided to computer 224 in the followwing manner. Video signals containing both video encoded digital data and picture video are provided on line 200 to the input of analog to digital converter 208. Converter 208 converts the video encoded digital data into NRZ digital data, which is applied as a serial stream of bits to the Disinterleaver and Parallelizer 210. This subcircuit 210 disinterleaves the serial stream of data according to the reverse matrix of the Interleaver and Serializer block 84 described above in connection with FIG. 6. The disinterleaved data is provided as 13-bit composite words on line 212 to the First Level ECC Corrector 214.

Corrector 214 operates on the words of data inputed thereto on line 212, utilizing the Hamming code bits of each composite word to correct single bit errors in each composite word. If all composite words from a single frame of a disc have no more than a single error per word, no further error correction is necessary and the corrected, recovered bytes are passed through the Second Level ECC Corrector 220 to the computer 224.

It will be noted that the First Level ECC Corrector 214 also corrects the composite words included on video line 22 of each field as described above, and applies the corrected bytes to the 'Line 22' Decoder 218. The 'Line 22' Decoder 218 decodes the recovered bytes and utilizes the information contained therein to provide a signal to enable the Analog to Digital Converter 208 and also to gate the system clock during those portions of video in which such data occurs, and otherwise to provide general control signals. 'Line 22' Decoder 218 also provides the decoded video 'line 22' information to computer 224 so that the computer 224 "knows" what the frame and field numbers are and how much data is provided in that field.

If more than one error occurs in any composite word on signal line 212, the Second Level ECC Corrector 220 performs a second level error correction process to the bytes of data in each column including such a multiple error byte. In many cases this second level ECC correction will result in the correction of such multibit errors. In those cases for which this second level correction is insufficient to correct the errors a signal is provided to computer 224.

The computer 224 is programmed in a manner described in further detail below, to perform a third level ECC correction process to the data provided to it on line 222 in those cases in which the first and second level ECC correctors were insufficient.

Figure 9A:
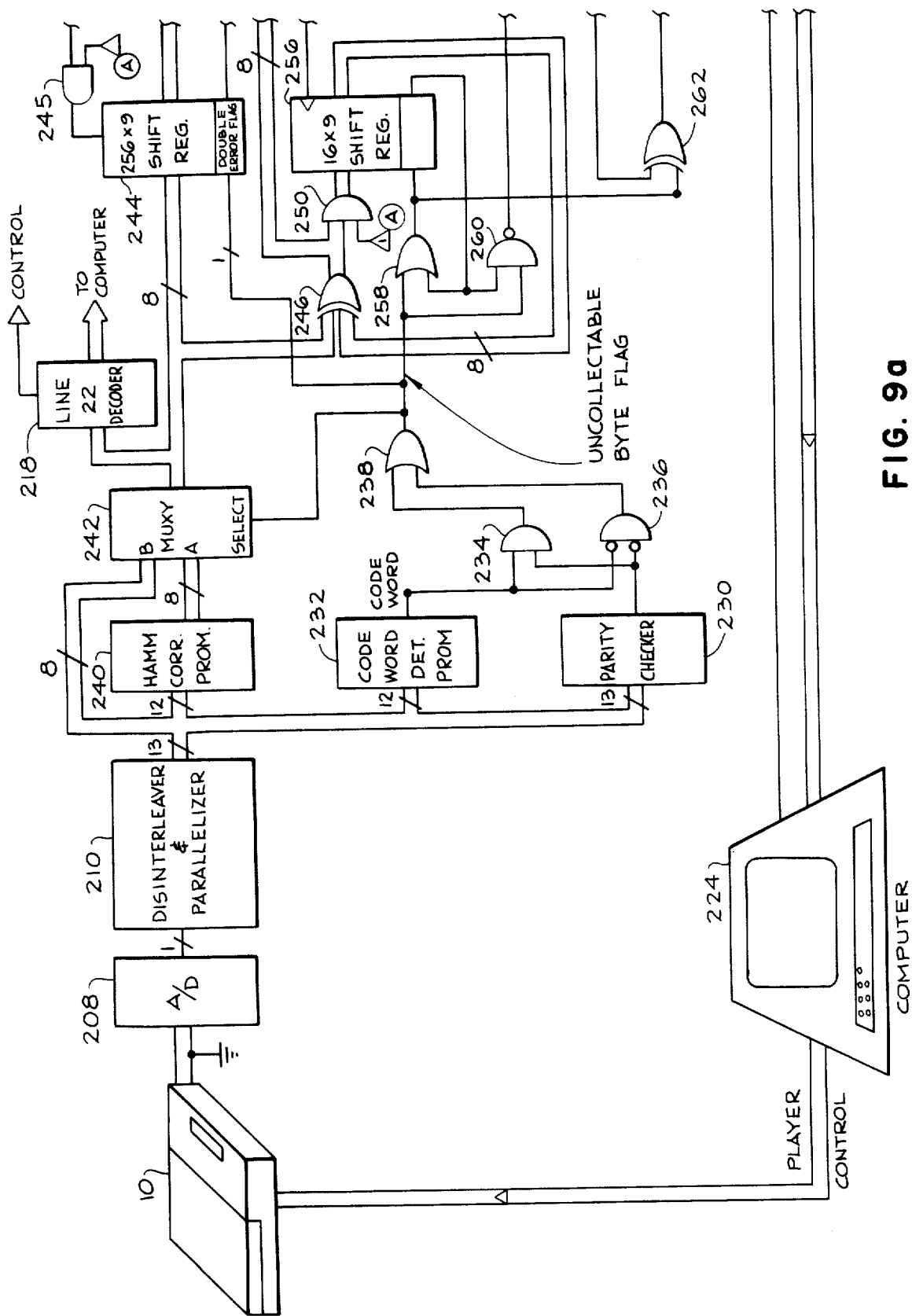
FIG. 9a and 9b are circuit diagrams of the system depicted in FIG. 8.
Figure 9B:
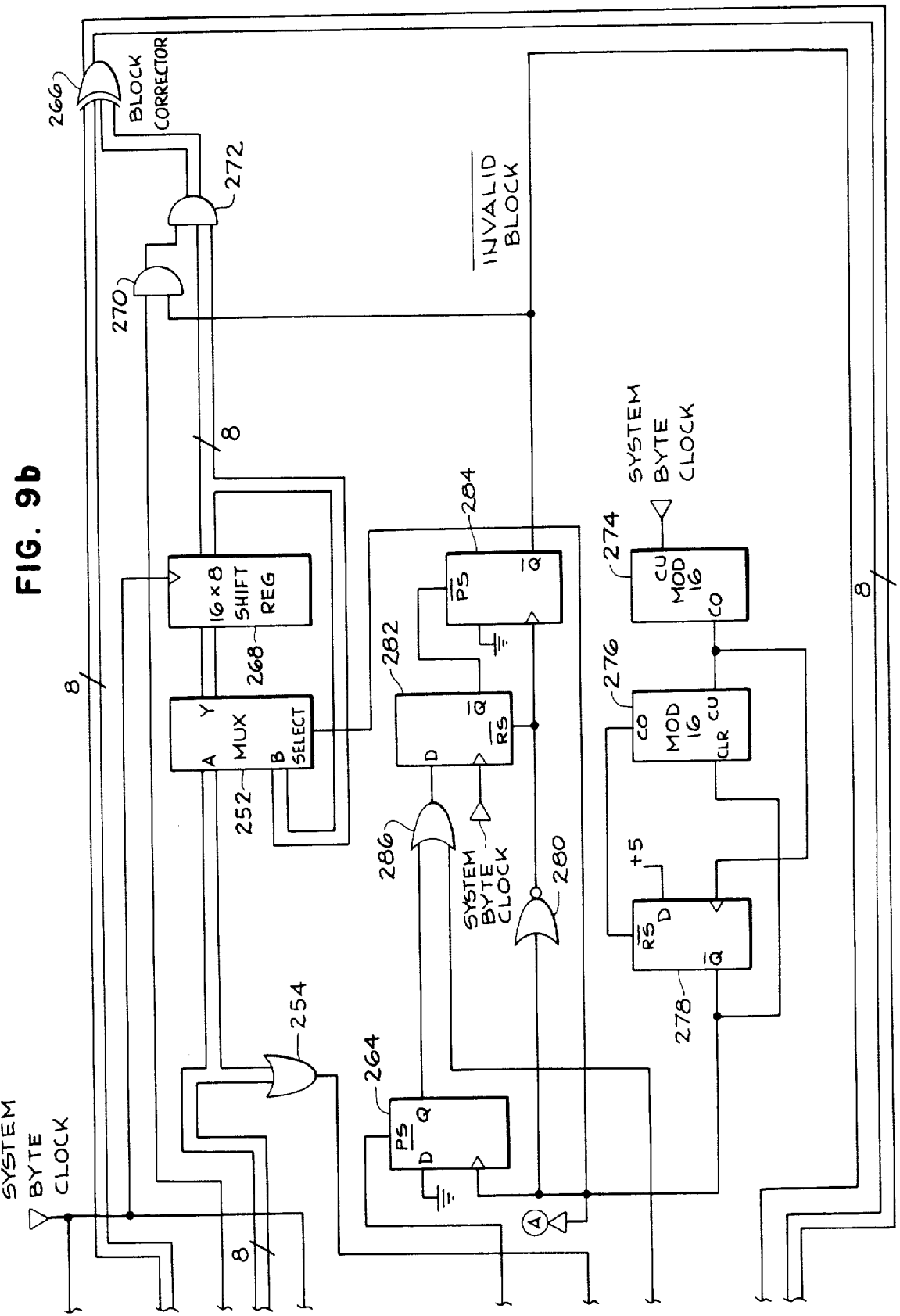

FIG. 9 is a schematic diagram of the decoder circuitry shown in block form in FIG. 8. The optical disc player 10 provides recovered video from a videodisc (not shown) to the Analog to Digital converter 208, which provides as an output a serial stream of digital data recovered from those portions of the video signal in which such digital data was encoded. The recovered digital data is applied to the Disinterleaver and Parallelizer 210.

The Disinterleaver and Parallelizer 210 is similar to the Serializer and Interleaver subcircuitry, comprising shift register 140, RAMs 142 and 144, PROMs 148 and 150, counter 152 and flip-flop 154, described above in connection with FIG. 7, only connected to operate in reverse fashion. Thus, the disinterleaving PROMS in Disinterleaver and Parallelizer 210 are programmed so as to cause the recovered serialized data provided from analog to digital converter 208 to be written into RAM storage in the address pattern in which they were read out of RAMs 142 and 144 during the encoding process (FIG. 7), and to be read out in the address pattern in which they were written into RAMs 142 and 144 during the encoding process (FIG. 7), that is, in ordinary serial sequential fashion.

The serial data stream is converted to parallel data using a shift register in the reverse process of the serializer using similar techniques.

The recovered 13-bit composite words are provided as outputs on thirteen parallel bit lines from Disinterleaver and Parallizer 210 to a parity checker 230. Parity checker 230 computes the parity of the 12 least significant bits of the composite word applied thereto and compares it with the most significant bit thereof, which, it will be recalled, is the value of the computed parity of the twelve least significant bits of the composite word generated in connection with the encoding process described above. If the parity of the twelve least significant bits of the 13-bit composite word applied to parity generator is equal to the bit value of the most significant bit thereof, parity checker 230 outputs a bit value of "one". If the values are not the same parity checker 230 outputs a "zero".

The twelve least significant bits of the composite word outputted from Disinterleaver and Parallelizer 210 are also applied to a code word detector PROM 232. PROM 232 provides as an output a digital bit indicating whether the twelve bits applied thereto actually comprise a possible composite word. If the twelve bits applied to PROM 232 comprise a possible composite word, PROM 232 provides as an output a bit having a value of "zero". If those 12 bits comprise a value which cannot be a composite word, the bit value outputted is a "one".

The outputs of prom 232 and parity checker 230 are applied to a subcircuit comprising an AND Gate 234, an inverted input AND Gate 236, and an exclusive OR Gate 238. The bit value of the output of OR Gate 238 is determined by any of four different conditions illustrated in the following table.

| CODE WORD VALID? | PARITY CORRECT? | MEANING | OR GATE 238 OUTPUT |
|---|---|---|---|
| YES | YES | NO ERROR | 0 |
| NO | NO | SINGLE BIT ERROR | 0 |
| NO | YES | DOUBLE BIT ERROR | 1 |
| YES | NO | TRIPLE BIT OR HIGHER ERROR | 1 |

The function of the output of exclusive OR Gate 238 is described in further detail below.

The twelve bits applied to the input of PROM 232 are also applied to the input of a novel Hamming Corrector PROM 240 and to the "B" input of a multiplexer 242. The Hamming Corrector PROM provides as an output the eight bits of the closest word which forms the basis for the Hamming encoded composite word applied to the input of PROM 240. This is the reverse of the function implemented by PROM 68, described above in connection with FIG. 7.

The output of prom 240 is applied to the "A" input of multiplexer 242.

The output of multiplexer 242 is applied to the least significant inputs of a 256×9 shift register 244, and to one set of inputs of eight exclusive OR Gates 246 (shown as one gate for clarity), and to the input of the Line 22 Decoder 218. The output of the exclusive OR Gates 246 comprises an 8-bit parallel digital data line which is connected to one set of inputs of eight AND Gates 250, also shown as one, to the "A" input of a multiplexer 252, and to the inputs of an OR Gate 254. The output of AND Gates 250 are connected to eight of the input ports of a sixteen long X nine wide shift register 256. The corresponding eight least significant bit output ports of shift register 256 are connected to the other set of inputs of Exclusive OR Gates 246.

The output of OR Gate 238 is connected to the SELECT input of multiplexer 242, to the most significant bit input port of shift register 244, to one input of an OR Gate 258, and to one input of an AND Gate 260. The most significant bit output of shift register 256 is connected to the other input of OR Gate 258 and to the other input of AND Gate 260. The output of OR Gate 258 is connected to one input of an Exclusive OR Gate 262 and to the most significant bit input port of shift register 256. The output of AND Gate 260 is connected to the $\overline{\text{PRESET}}$ input of a flip-flop 264.

The CLOCK inputs of shift registers 244 and 256 are connected to the system byte clock, which is obtained by dividing the video chroma signal by 13. The chroma signal is recovered from the color burst in the video signal by known means.

Referring now to Table 1, described above, when the output of OR gate 238 has a value of zero, signifying that the present composite word includes a single bit error, which is correctable by way of the Hamming correction PROM 240, or that no error exists, multiplexer 242 selects the A input thereof. The correct eight bits of the recovered data byte are passed through multiplexer 242 to shift register 244. On the other hand, if the output of OR Gate 238 has a value of ONE, indicating a double or higher bit error in the composite word, the "B" input of multiplexer 242 is selected and the eight least significant bits of the composite word are passed through multiplexer 242 to the input of shift register 244 and to the inputs of Exclusive OR Gates 246. Simultaneously, a bit value of one is applied to the most significant bit input port of both shift register 244 and shift register 256.

For the first sixteen bytes, that is the entire first line of the block being processed, the eight bits applied to the input of Exclusive OR Gates 246 are passed through unaffected to the eight least significant bit input ports of shift register 256, because the previous contents of shift register 256 are all zeros.

A bit value of one applied to the most significant bit input port of shift register 244 comprises an error flag which passes through shift register 244 along with the associated error-containing byte. As that byte is shifted out of shift register 244, the error flag bit is shifted out along with that byte. The significance of this is discussed in further detail below. A bit value of one entered into the most significant bit input port of shift register 256 also comprises an error flag for that byte. However, as shift register 256 is clocked, any entered error bit flag is recirculated in modulo 16 fashion. It will be recalled that each line in a block comprises sixteen bytes. Thus, the effect of the circulation of an error flag bit in shift register 256 is to flag all columns containing a double bit or higher error. This is described in further detail below.

As mentioned above, the first sixteen bytes outputted by multiplexer 242 are all Exclusive OR-ed in Exclusive OR gates 246 with zeros, and thus pass unaffected through Exclusive OR Gates 246 to the input of shift register 256. The bytes of the next group of sixteen bytes outputted by multiplexer 242, however, are exclusive OR-ed by Exclusive OR Gates 246 with the bytes in the first group of 16 bytes occupying the same position within that group of 16 bytes. Thus, the first byte of the first group of 16 bytes is exclusive OR-ed with the first byte of the second group of sixteen bytes, the second byte in the first group with the second byte in the second group, and so forth.

The third group of sixteen bytes are Exclusive OR-ed in Exclusive OR Gates 246 with the result of the previous Exclusive OR operation for those bytes similarly situated within that group of sixteen bytes. This process continues until all sixteen groups of sixteen bytes have been outputted from multiplexer 242, and have also thereby been loaded into shift register 244. Because each such group of sixteen bytes comprises a line within the 272-byte block being processed, the final contents of shift register 256 comprise the computed parity bits for each byte actually recovered from the disc being played on player 10 similarly situated within each row of the data block being processed.

The next sixteen system byte clock pulses clock the row 42 (FIG. 2) of parity bytes for that block, previously computed and sent with that block of data, out of multiplexer 242, to the previously described first set of inputs of Exclusive OR Gates 246 but not into shift register 244 as the clock of that device is inhibited during this period by action of 'AND' gate 245. The resultant output during this sequence of sixteen system byte clock pulses is the result of an Exclusive OR operation between each parity bit previously computed during the encoding process and retrieved along with the block of data from the disc being played, and the corresponding computed parity bits of the bits of data recovered from the disc. Any difference between any such corresponding bits results in the generation of a correction bit value of one at the output of Exclusive OR Gate 246 at that bit location during that Exclusive OR operation. During this sequence of sixteen system byte clock pulses, multiplexer 252 is set to select the "A" input thereof. The bytes of correction bits, comprising the results of this final Exclusive OR operation are, therefore provided to the output of multiplexer 252. The output of multiplexer 252 is connected to the input of a 16×8 shift register 268. Also during this time eight AND gates 250 are inhibited by the same signal that controls the SELECT of multiplexer 252, thus causing zero's to be clocked into shift register 256 in preparation for the next block of two hundred and seventy-two bytes.

As the last sixteen system byte clock pulses of the first group of two hundred seventy-two system byte clock pulses are generated, the computed bytes of correction bits are clocked through shift register 268.

The next two hundred seventy-two system byte clock pulses result in a repeat of the above described operations on the next two hundred seventy-two bytes of data, that is, the next block of data provided from the player 10. In addition, the following, second level error correction operation is implemented on the first block of two hundred seventy-two bytes of data.

As the first sixteen bytes of data are clocked out of shift register 244, the bytes of correction bits stored in shift register 268 are likewise clocked out of shift register 268. For the first two hundred fifty-six system byte clock pulses of this subsequent group of two hundred seventy-two clock pulses, the SELECT input of multiplexer 252 is set to select the "B" input thereof. This causes the correction bit bytes to circulate through shift register 268 repeatedly sixteen times.

As the bytes are clocked out of shift register 244, those bytes containing double bit errors can be corrected if they are subjected to an Exclusive OR operation with a byte comprising all zeros in those bit locations wherein the bits are known to be correct, and containing bits having a value of one in those bit locations where it is known that the bit values in the byte are in error. The byte stored in shift register 268 comprise just such error correction bits for those bytes in shift register 244 having correctable double bit errors.

When such a double bit error containing byte appears at the output of shift register 244 a one appears at the most significant bit output port thereof. This sets one input of an AND gate 270 high. The other input of AND gate 270 is also high if it has not been determined, in a manner described below, that an invalid block, that is an uncorrectable block, exists. When the output of AND gate 270 is high a further eight AND gates 272 (one only shown for clarity) are enabled, thus permitting the aforementioned exclusive OR operation, by way of eight exclusive OR gates 266, to be performed on the double bit error identified byte being clocked out of shift register 244.

Conversely, if an invalid block has been determined, the output of AND gate 272 is held low and the data is shifted through exclusive OR gate 266 unaffected.

There are several possible types of multiple errors which cannot be corrected by the above-described first and second order error correction system.

First, if two bytes in the same column contain errors in different bits (i.e., 1010EE and 00EE00, where "E" represents an error), the resultant correction bits would be 001111 for that column. However, since a double error flag would be generated for each byte containing errors, use of these correction bits would erroneously alter some of the originally correct bits of each byte (i.e., resulting in 10EE00 and 0011EE).

NAND gate 260 detects the presence of two double errors in the same column by looking for the simultaneous occurrence of a double error signal at the output of OR gate 238 and at the output of shift register 256.

When this occurs, the output of NAND gate 260 goes low, thus presetting flip-flop 264, to cause the Q output of flip-flop 264 to go high, thereby saving the information in the form of a "one" level signal at the Q output of flip-flop 264 that an uncorrectable double bit error condition has occurred.

Second, if a triple or higher error occurs in a word and is not detected by the code word detector 232, no error flag will be generated. However, Exclusive OR gates 246 would generate an error correction word which would be sent to multiplexer 252. Since no flag was generated, the multiplexer would not receive a SELECT signal, and the correction word would not be applied.

OR gate 254 detects the presence of the correction word and Exclusive OR gate 262 detects the simultaneous lack of an error flag, and its output goes high.

Third, if two bytes in a column have errors and only one of the error containing bytes is detected by code detector 232, only one error flag will be generated. It is possible that if the errors are in the same bits, they will cancel in the column parity check performed by Exclusive OR gates 246, meaning that no correction bits will be produced.

This situation will also be detected by Exclusive OR gate 262 and results in a high level at its output.

The high level output of flip-flop 264 or Exclusive OR gate 262 is utilized, in a manner which will now be described, to create a signal indicating an invalid, that is, uncorrectable, block of data.

The system byte clock is applied to the COUNT-UP input of modulo-16 counter 274. The CARRY OUT output of counter 274 is connected to the COUNT UP input of a further modulo-16 counter 276 and to the CLOCK input of a D-type flip-flop 278. The CARRY OUT output of counter 276 is connected to the $\overline{\text{RESET}}$ input of flip-flop 278.

The $\overline{Q}$ output of flip-flop 278 is connected to the CLEAR input of counter 276, to the SELECT input of multiplexer 252, to an input of AND gate 245, to the input of an inverter 280, to the CLOCK input of flip-flop 264, and to the inputs of eight AND Gates 250 described above. The output of inverter 280 is connected to the $\overline{\text{RESET}}$ input of a further D-type flip-flop 282, and to the CLOCK input of a still further D-type flip-flop 284. The CLOCK input of flip-flop 282 is connected to the system byte clock. The $\overline{Q}$ output of flip-flop 282 is connected to the $\overline{\text{PRESET}}$ input of flip-flop 284. The outputs of Exclusive OR Gate 262 and of flipflop 264 are connected, respectively, to the inputs of an OR Gate 286, the output of which is connected to the D input of flip-flop 282.

The system byte clock, it will be recalled, provides a square wave signal at the frequency bytes of data are shifted throughout the circuit of FIG. 9. These clock pulses are counted by modulo-16 counter 274, and every sixteen system byte clock pulses the CARRY OUT output of clock 274 provides a pulse output. These output pulses from counter 274 are counted by modulo-16 counter 276. They also clock flip-flop 278. Counters 274 and 276 and flip-flop 278 are interconnected in such a manner that the $\overline{Q}$ output of flip-flop 278 remains high throughout the first two hundred fifty-six system byte clock pulses, following which the CARRY OUT output of counter 276 goes high, releasing flip-flop 278, allowing the $\overline{Q}$ output thereof to go low. The $\overline{Q}$ output of flip-flop 278 remains low for the next 16 system byte clock pulses, at which time the CARRY OUT output of counter 276 goes low resetting flip-flop 278, and thus driving the $\overline{Q}$ output thereof high.

The low signal on output $\overline{Q}$ of flip-flop 278 during the last sixteen counts of each of the blocks of two hundred seventy two byte clock pulses, is to cause multiplexer 252 to select the "A" input thereof, as described above. In addition, the action of inverter 280, flip-flop 282 and 284, and of OR Gate 286 causes a low level signal to be provided at the $\overline{Q}$ output of flip-flop 284 if either of the outputs of exclusive OR Gate 262 or flip-flop 264 is high. A low level signal at the $\overline{Q}$ output of flip-flop 284 indicates that an invalid block is being sent through exclusive OR gates 266.

This control system self resets each block so that an invalid block decision can be made for each block. It is also reset by vertical sync pulses. Both corrected blocks of data and invalid blocks of data are clocked through exclusive OR Gates 266 and are provided to the computer 224. If an invalid block signal is provided to computer 224, entire blocks of data can be reconstructed using the Frame ECC parity block described above, by an analogous process of Exclusive OR-ing blocks of parity bits derived from the data provided to the computer with the Frame ECC parity bit block. The programming of computer 224 to execute this function is considered well within the scope of one having ordinary skill in this art, once the principles of the present invention, described herein, are understood.

The computer receives information concerning the amount of data received by it for a particular field from line 22 decoder 248, described above.

It will be appreciated that the invention described herein represents a significant advance in the field of digital data storage generally, and more particularly in video format digital data storage and retrieval systems. The invention provides for the storage of over 300,000,000 bytes on a single surface of a laser optical disc for substantially real time retrieval therefrom. Error frequency is better than one in $10^{12}$, which is acceptable for most digital data storage applications. In addition, by virtue of the relatively low cost of the laser optical disc, the present invention provides for a low cost technique for the storage of digital data for computer applications. It will also be appreciated that, although a specific embodiment of the invention as been described in detail for purposes of illustration, various modifications may be made without departing from the spirit and scope of the invention. For example other forms of block codes than the Hamming code may be used in connection with the practice of the present invention. In addition, Frame ECC error correction can be implemented by way of a hardware circuit analogous to those described in connection with the Line and Block ECC error correction circuitry described in connection in FIG. 9. All of these modifications are well within the scope of one with ordinary skill in this art, once the principles of the present invention described herein are understood. Accordingly, the invention is not to be limited except as by the appended claims.

We claim:

1. Apparatus for correcting errors in digital data stored on a storage medium and recovered therefrom, said apparatus comprising:
   means for arranging the bytes of data to be stored on the storage medium into a plurality of code blocks each having a first predetermined number of columns and a second predetermined number of rows of bytes;
   first order means for generating a parity block of first order parity bytes, said parity block having a number of columns and a number of rows of bytes corresponding to said first predetermined number and said second predetermined number, respectively, such that the first order parity bits in said parity block correspond to the computed parity of the combined corresponding bits in each of said code blocks;
   second order means for generating a parity row of second order parity bytes for each of said data blocks and said parity block, such that each bit of each said second order parity byte corresponds to the computed parity of the combined corresponding bits in each byte in the column of the block associated with that parity row, said second order means adding each said row to its associated block; and
   means for generating a correction control word for each byte of all of said blocks, and for adding each said correction control word to each said byte for which said correction control word is generated, to form a composite word.

2. The apparatus as claimed in claim 1, further comprising:
   means for interleaving the bits of said composite words for each of said blocks according to a matrix having a third predetermined number of rows and a fourth predetermined number of columns, and for providing said interleaved bits in serial arrangement for storage on the storage medium.

3. The apparatus as claimed in claim 2, further comprising:
   means for disinterleaving the bits recovered from said storage medium according to the reverse of said matrix to reform said composite words.

4. The apparatus as claimed in claims 1 or 3, further comprising:
   composite word error correction means for applying a first correction step to the composite words recovered from the storage medium using said correction control word to correct any single erroneous bits in each data byte or parity byte;
   double error detection means for determining if more than one bit error exists in at least one of said composite words and for bypassing said composite word error correction means;
   second order parity correction means responsive to said double error detection means for applying a second correction step using said row of second order parity bytes to correct said erroneous bits; and
   compound error detection means for determining if said more than one bit errors cannot be corrected using said second order parity correction means and for bypassing said second order parity correction means.

5. The apparatus as claimed in claim 4, further including first order correction means responsive to said compound error detection means for correcting compound errors using the first order parity bits.

6. The apparatus as claimed in claim 1, wherein said first order means includes:
   a shift register for temporarily storing as many bytes as contained in one of said blocks; and
   eight Exclusive OR circuits each having one input connected to receive the data to be stored on the storage medium and the second input connected to the output of said shift register, the output of said Exclusive OR circuits being connected to the input of said shift register,
   whereby when the bytes of data of a particular block are clocked through said Exclusive OR circuits, they are combined with the parity of the respective bytes of the previous blocks clocked through said Exclusive OR circuits to generate parity bytes of the particular block and the previous blocks, thereby generating the parity block.

7. The apparatus as claimed in claim 1, wherein said second order means includes:
   a shift register for temporarily storing as many bytes as contained in one of said rows in said blocks; and
   eight Exclusive OR circuits each having one input connected to receive data and parity bytes from said first order means and having the second input connected to the output of said shift register, the output of said Exclusive OR circuits being connected to the input of said shift register, whereby when the bytes of a particular row of a particular block are clocked through said Exclusive OR circuits, they are combined with the parity of the respective bytes of the previous rows of the particular block clocked through said Exclusive OR circuits to generate parity bytes of the particular row and the previous rows of the particular block, thereby generating the parity row for the particular block.

8. The apparatus as claimed in claim 1, wherein said means for generating a correction control word includes:
programmed permanent memory means having a plurality of addressable storage locations, each of said locations containing the correction control word for a byte of a particular value; and
addressing means for accessing the storage location containing the correction control word corresponding to the value of an input byte.

9. The apparatus as claimed in claim 2, wherein said means for interleaving includes:
addressable temporary storage means for storing a plurality of composite words equal to said third predetermined number multiplied by said fourth predetermined number, said temporary storage means having a corresponding plurality of bit storage locations, each said location having a unique address;
sequential read-in addressing means for selecting a unique one of said storage locations in which to store each one of a corresponding plurality of bits in accordance with a first predetermined sequence;
sequential read-out addressing means for sequentially selecting each of the addresses of said storage locations in a second predetermined sequence in order to read-out each of the stored bits in an order different from the storing order.

10. The apparatus as claimed in claim 9, wherein said second predetermined sequence is related to said first predetermined sequence in such a way that the bits of a composite word are separated from each other by more than the number of bits in the word.

11. The apparatus as claimed in claim 9 or 10, wherein said read-in addressing means and said read-out addressing means include programmed permanent storage means each having a corresponding plurality of sequentially selectable storage locations, the storage locations of said read-in addressing means containing the addresses of said temporary storage locations in said first predetermined sequence, the storage locations of said read-out addressing means containing the addresses of said temporary storage locations in said second predetermined sequence.

12. The apparatus as claimed in claim 9, further including:
a second addressable temporary storage means;
a second read-in addressing means connected to said second addressable temporary storage means;
a second read-out addressing means connected to said second addressable temporary storage means; and
switch means selectable between a first state activating the first-named read-in addressing means for reading bits into the first-named temporary storage means and simultaneously activating said second readout addressing means for reading bits out of said second temporary storage means, and a second state in which the first-named read-out addressing means and said second read-in addressing means are activated.

13. The apparatus as claimed in claim 4, wherein said second order parity correction means includes:
means for generating a series of column parity error bits by computing the parity of all of the bits in each column of bits of a block of data and the previously-computed parity bit for each row;
means for combining the erroneous bits in a byte indicated by said double error detection means as having more than one error with the parity error bits for the columns of bits containing the erroneous bits of that byte.

14. The apparatus as claimed in claim 13, wherein said means for generating a series of column parity error bits includes an Exclusive OR circuit; and a shift register.

15. The apparatus as claimed in claim 13, wherein said means for combining includes an Exclusive OR circuit.

16. An error correction apparatus for detecting and correcting errors in digital information recovered from a storage medium, said apparatus comprising:
means for arranging the information to be stored on the storage medium in blocks of a selected number of bits b;
means for generating a group of n first order parity bits by computing parity for each sequence of every nth bit of the b bits of the block, where b is an integer multiple of n;
means for generating b/n+1 further groups of m second order parity bits by computing parity for each sequence of every mth bit in each sub-block of n bits of the b bits of the block and the n first order parity bits, where n is an integer multiple of m;
means for generating error correction bits for each group of c bits of the b bits of the block and the n first order parity bits and the (b/n+1)m second order parity bits, each group of c bits and its associated error correction bits, forming a composite word;
means for sequentially feeding to the storage media each composite word formed from the bits of each sub-block of n data bits and its associated second order parity bits, followed by each composite word formed from the parity bits of the n first order parity bits and their associated second order parity bits.

17. The apparatus as claimed in claim 16, wherein said means for sequentially feeding includes means for interleaving the bits such that each bit of a composite word is separated from the other bits of that composite word by more than the number of bits in the word.

18. The apparatus as claimed in claim 16, further comprising:
bit correction means receiving information recovered from the storage medium and utilizing the error correction bits in a word to correct the other bits in the word; and
second order correction means for correcting errors in the bits of each sub-block and the first order parity bits using the second order parity bits.

19. The apparatus as claimed in claim 18, further comprising:
parity error detection means including means for checking the parity of each sequence of every mth bit recovered from the storage medium with the associated second order parity bits;
error correction bit validity detection means for comparing the error correction bits of a composite word recovered from the storage medium with the remaining bits of that word;
switching means responsive to said parity error detection means and said error correction bit validity detection means to route the recovered composite word through said bit correction means if neither or both of said parity error detection means and said error correction bit validity detection means indicate the presence of an error in the recovered composite word, and to route the recovered composite word directly to said second order correction means if one or the other but not both of said parity error detection means and said error correction bit validity detection means indicates an error in a composite word.

20. The apparatus as claimed in claim 18 or 19, further comprising first order error correction means utilizing the first order parity bits to correct errors in the data bits.

21. The apparatus as claimed in claim 20, further comprising:
   compound error detecting means for indicating the presence of a compound error including two or more errors in a given sequence of every mth bit in a subblock requiring the use of said first order error correction means; and
   switching means for bypassing said second order error correction means when said compound error detection means indicates the presence of a compound error.

22. Apparatus for encoding a plurality of bytes of digital data into further plurality of bits suitable for storage in a storage medium and for recovery therefrom, comprising;
   (a) means for arranging said bytes of data into a plurality of data blocks each having a first predetermined number of columns and a second predetermined number of rows of bytes;
   (b) means for generating a parity block of bytes of data having a number of columns and a number of rows of bytes corresponding to said first predetermined number and said second predetermined number, respectively, such that the bits of data in said parity block correspond to the computed parity of the combined corresponding bits in each of said data blocks;
   (c) means for generating a parity row of bytes of data for each of said data blocks and said parity block such that each bit of said parity bytes in said parity rows corresponds to the computed parity of the combined corresponding bits in each byte in the respective column of the associated block of that parity row, and for adding each said row to its associated block;
   (d) means for generating a correction control word for each byte of all said data blocks and said parity block for adding each said correction control word to each said byte for which said correction control word is generated, to form a composite word; and
   (e) means for interleaving the bits of said composite words of data for each of said blocks according to a matrix having a third predetermined number of rows and a fourth predetermined number of columns, and for providing said interleaved bits in serial arrangement.

23. Apparatus for decoding into recovered data bytes a plurality of bits, wherein said bits are generated from said data bytes by the steps of arranging said bytes of data into a plurality of data blocks each having a first predetermined number of columns and a second predetermined number of rows of bytes; generating a parity block of bytes of data having a number of columns and of rows of bytes corresponding to said first predetermined number and said second predetermined number, respectively, the bits of data in said parity block corresponding to the computed parity of the combined corresponding bits in each of said data blocks; generating a parity row of bytes of data for each of said data blocks and said parity block such that each bit of each of said parity bytes in said parity rows corresponds to the computed parity of the combined corresponding bits in each byte in the respective column of the associated block of that parity row, and adding each said row to its associated block; generating a correction control word for each byte of all of said data blocks and said parity block, and adding said correction control word to said bytes for each said correction control word was generated, to form a composite word; interleaving the bits of said composite words of data for each of said blocks according to a matrix having a third predetermined number of rows and a fourth predetermined number of columns, and providing said interleaved bits in serial arrangement; comprising:
   (a) means for disinterleaving said bits of data according to the reverse of said matrix into said composite words;
   (b) means for determining if a bit error exists in one of said composite words and for applying a first correction step using said correction control word to correct said erroneous bit;
   (c) means for determing if more than one bit error exists in at least one of said composite words and for applying a second correction step using said row of parity bytes of data to correct said erroneous bits; and
   (d) means for determining if said more than one bit errors cannot be corrected using said first determining means and for applying a third correction step using said parity block of bytes to correct said errors.

24. Method for encoding a plurality of bytes of digital data into a further plurality of bits suitable for storage in a storage medium and for recovery therefrom, comprising the steps of:
   (a) arranging said bytes of data into a plurality of data blocks each having a first predetermined number of columns and a second predetermined number of rows of bytes;
   (b) generating a parity block of bytes of data having a number of columns and a number of rows of bytes corresponding to said first predetermined number and said second predetermined number, respectively, such that the bits of data in said parity block correspond to the computed parity of the combined corresponding bits in each of said data blocks;
   (c) generating a parity row of bytes of data for each of said data blocks and said parity block such that each bit of each of said parity bytes in said parity rows corresponds to the computed parity of the combined corresponding bits in each byte in the respective column of the associated block of that parity row, and for adding each said row to its associated block;
   (d) generating a correction control word for each byte of all said data blocks and said parity block, and for adding each said correction control word to each said byte for which said correction control word is generated, to form a composite word; and
   (e) interleaving the bits of said composite words of data for each of said blocks according to a matrix having a third predetermined number of rows and a fourth predetermined number of columns, and for providing said interleaved bits in serial arrangement.

25. Method for decoding into recovered data bytes a plurality of bits, wherein said bits are generated from said data bytes by the steps of arranging said bytes of data into a plurality of data blocks each having a first predetermined number of columns and a second predetermined number of rows of bytes; generating a parity block of bytes of data having a number of columns and of rows of bytes corresponding to said first predetermined number and said second predetermined number, respectively, the bits of data in said parity block corresponding to the computed parity of the combined corresponding bits in each of said data blocks; generating a parity row of bytes of data for each of said data blocks and said parity block such that each bit of each of said parity bytes in said parity rows corresponds to the computed parity of the combined corresponding bits in each byte in the respective column of the associated block of that parity row, and adding each said row to its associated block; generating a correction control word for each byte of all of said data blocks and said parity block, and adding said correction control word to said bytes for which said correction control word was generated, to form a composite word; interleaving the bits of said composite words of data for each of said blocks according to a matrix having a third predetermined number of rows and a fourth predetermined number of columns, and providing said interleaved bits in serial arrangement; said method comprising the steps of:

(a) disinterleaving said bits of data according to the reverse of said matrix into said composite words;

(b) determining if a bit error exists in one of said composite words and for applying a first correction step using said correction control word to correct said erroneous bit;

(c) determining if more than one bit error exists in at least one of said composite words and for applying a second correction step using said row of parity bytes of data to correct said erroneous bits; and (d) determining if said more than one bit errors cannot be corrected using said first determining means and for applying a third correction step using said parity block of bytes to correct said errors.

* * * * *